(12) United States Patent
Bhatt

(10) Patent No.: US 9,743,251 B2
(45) Date of Patent: *Aug. 22, 2017

(54) ADDING LOCATION NAMES USING PRIVATE FREQUENT LOCATION DATA

(71) Applicant: Apple Inc., Cupertino, CA (US)

(72) Inventor: Nikhil M. Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,680

(22) Filed: Jan. 9, 2017

(65) Prior Publication Data

US 2017/0180944 A1 Jun. 22, 2017

Related U.S. Application Data

(63) Continuation of application No. 14/604,526, filed on Jan. 23, 2015, now Pat. No. 9,544,726.

(51) Int. Cl.
| | |
|---|---|
| *H04W 4/02* | (2009.01) |
| *H04W 76/02* | (2009.01) |
| *H04W 12/02* | (2009.01) |
| *H04L 29/08* | (2006.01) |
| *H04W 4/00* | (2009.01) |

(52) U.S. Cl.
CPC .......... *H04W 4/028* (2013.01); *H04L 67/306* (2013.01); *H04W 12/02* (2013.01); *H04W 76/023* (2013.01); *H04W 4/008* (2013.01)

(58) Field of Classification Search
CPC ... H04W 4/028; H04W 76/023; H04W 12/02; H04W 4/008; H04L 67/306
See application file for complete search history.

(56) References Cited

U.S. PATENT DOCUMENTS

| | | | |
|---|---|---|---|
| 7,719,576 | B2 | 5/2010 | Abraham |
| 8,718,373 | B2 * | 5/2014 | Mendis .............. G06K 9/00671 |
| | | | 382/181 |
| 9,544,726 | B2 * | 1/2017 | Bhatt ...................... H04W 4/02 |
| 2006/0208943 | A1 | 9/2006 | Gronemeyer |
| 2006/0258368 | A1 | 11/2006 | Granito |
| 2008/0174676 | A1 | 7/2008 | Squilla |
| 2011/0191498 | A1 | 8/2011 | Whitham |
| 2011/0264715 | A1 | 10/2011 | Singer |
| 2012/0036132 | A1 | 2/2012 | Doyle |
| 2013/0072215 | A1 | 3/2013 | Persson |
| 2013/0190004 | A1 | 7/2013 | Papakipos |

* cited by examiner

*Primary Examiner* — Brandon Miller
(74) *Attorney, Agent, or Firm* — Blank Rome LLP

(57) ABSTRACT

Disclosed herein are systems, methods, and non-transitory computer-readable storage media for tagging media files from a media capture device with location information gathered from a portable device when the portable device determines that a user of the media capture device frequents the location and that the media item was captured in the location.

20 Claims, 11 Drawing Sheets

ADDING LOCATION NAMES USING PRIVATE FREQUENT LOCATION DATA

BACKGROUND

1. Technical Field

The present disclosure relates to tagging media files and, more specifically, to tagging media files with location data.

2. Introduction

Digital media files, such as digital photographs, can include metadata fields for describing a place in which the media file was captured. Some electronic devices can also determine their own location. However, when an image capture device cannot determine its own location, the captured media does not include metadata describing location.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for tagging media files from a media capture device with location information gathered from a portable device when the portable device determines that a user of the media capture device frequents the location and that the media item was captured in the location. The media capture device is a separate device from the portable device and does not have its own ability to access location data. For example, the media capture device can be a camera without GPS functionality and the portable device can be a smartphone.

In some embodiments of the present technology, a media processing system imports media from a media capture device. The captured media can have a capture timestamp describing when the media file was captured, but that does not include location metadata.

The media processing system can also receive a frequent location log from a portable electronic device. The frequent location log can describe temporal information relating to a time and a place description in which the portable electronic device is frequently located.

The portable electronic device and the media processing system can ensure that users' private data is protected by requiring that the media processing system and the portable electronic device receive a user's instruction to opt in to sharing location data. The portable electronic device and the media processing system can ensure that a user's private data is protected by requiring the portable electronic device and the media processing system are connected via a short-range peer-to-peer radio frequency and confirming that the media processing system and the portable electronic device share a common credential with a cloud services platform.

The media processing system can include a location auto-tagging module configured to automatically tag the media file with a place description from a locations database when the capture timestamp describing when the media file was captured correlates with the location timestamp corresponding to when the frequent location was visited.

In some embodiments, determining that the capture timestamp describing when the media file was captured correlates with the location timestamp corresponding to when the frequent location was visited involves determining a time difference between the timestamp of the media file and the time from the temporal information from the frequent location log and determining that the time difference falls below a predetermined threshold time difference.

In some cases, a media capture device might not contain a clock and is unable to tag captured media with time stamps. Similarly, the media capture device can contain a clock that is set to a wrong time, a different time zone than the portable electronic device, in a different daylight saving mode than the portable electronic device, etc. Accordingly, some embodiments of the present technology involve requesting user feedback about correlating captured media to moments in time and correcting timestamps to account for differences in time zone, daylight savings mode, etc.

In some embodiments, prior to tagging the media file with a place description from the locations database, the media processing system displays the place description along with the media file. When the media processing system receives a confirmation from a user of the media processing system that the place name describes a moment when the media file was captured, the media processing system defines a time frame substantially equal to the time difference between the timestamp of the media file and the time from the temporal information, and automatically tags subsequently received media files with a place name when their timestamp and received temporal information are both within the defined time frame.

Some embodiments of the present technology involve correcting the timestamp of the media file and the time from the temporal information to be based in the same time zone. Some embodiments of the present technology involve correcting the timestamp of the media file and the time from the temporal information to be based in the same daylight savings time system.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for receiving location data describing where images were captured when an image capture device cannot determine its own location.

An electronic device can include a geolocation system for identifying a location of the device, assessing the location, identifying an address near the location, performing a reverse address lookup to determine a place name associated with the address, etc. In some embodiments of the present technology, an electronic device is configured to log information about the device's location and identify a group of frequent locations using a set of heuristics. The location information can be used to provide the user with other content of interest to them. For example, as explained below, frequent location data can be used to tag media content on another device when the media content does not include location data.

FIGS. 1A-1E illustrate examples of a graphical user interface for enabling and exploring a group of frequent locations logged in an electronic device according to some embodiments of the present technology.

Figure 1A:
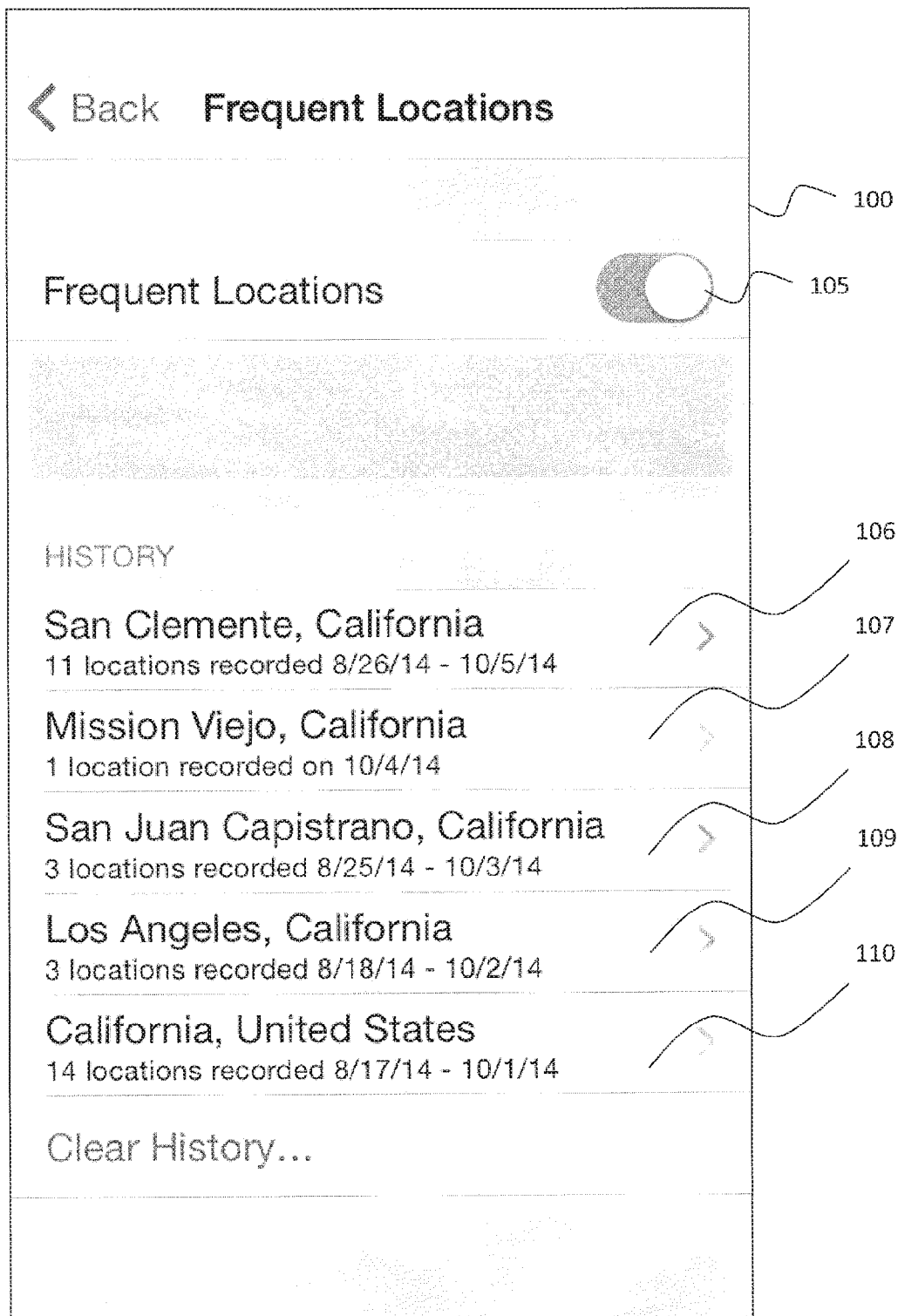
FIGS. 1A, 1B, 1C, 1D, and 1E illustrate examples of a graphical user interface for enabling and exploring a group of frequent locations logged in an electronic device according to some embodiments of the present technology.

FIG. 1A shows a frequent locations interface 100 with a selection element 105 for allowing a user to turn a frequent location-logging feature off or on. In some embodiments, a user is required to positively select the selection element 105 to opt in to frequent location-logging feature. The frequent locations interface 100 can also show a history of selectable frequent location tabs 106, 107, 108, 109, 110 that can be selected to examine the frequent location in greater detail. The selectable frequent location tabs 106, 107, 108, 109, 110 can also list information about a number of more precise sub-locations contained within a frequent location. Selection of a frequent location tab can cause the electronic device to display a frequent sub-location interface providing a more detailed view of the frequent location.

Figure 1B:
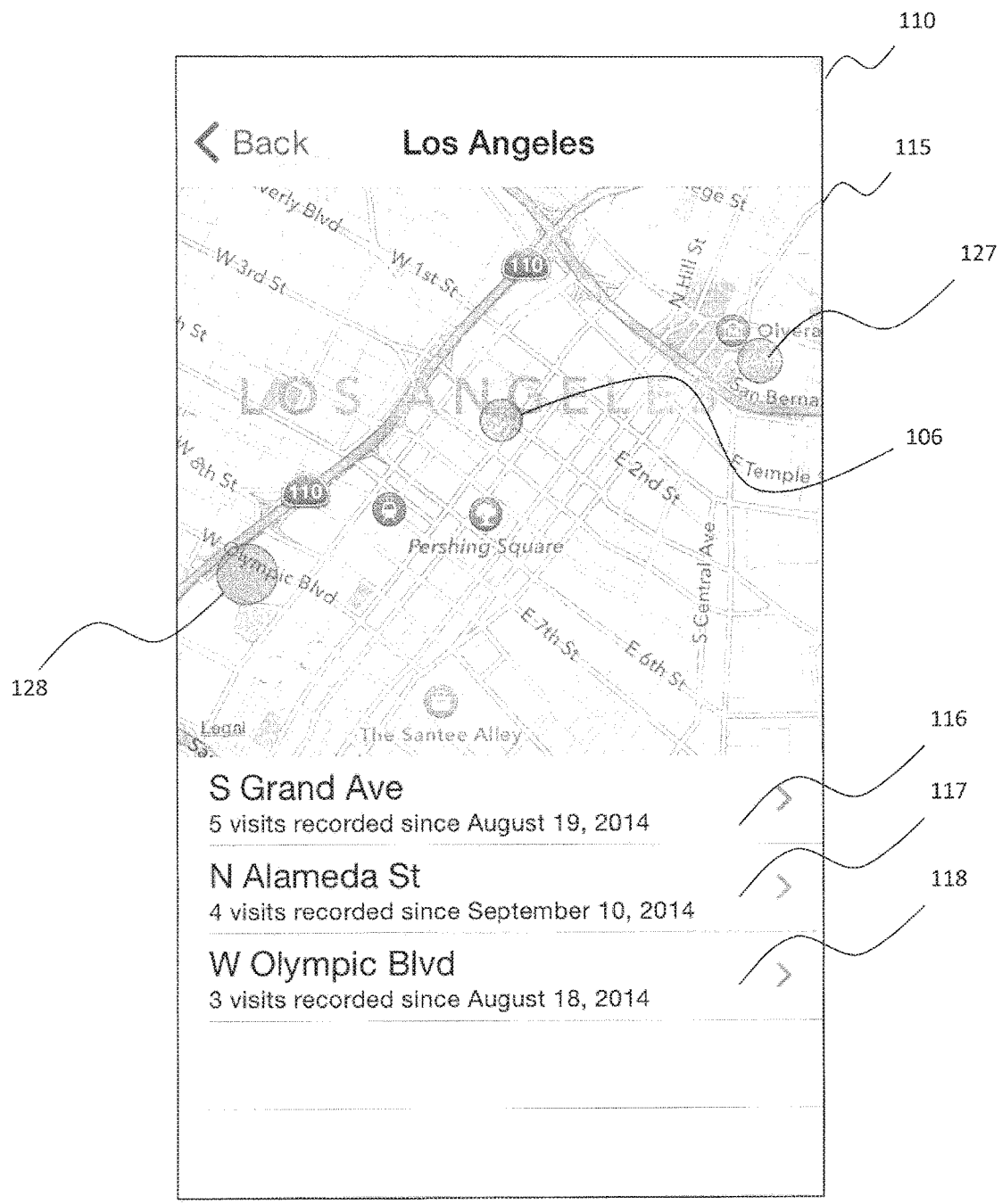

FIG. 1B illustrates a frequent sub-locations interface 110 showing a map-view 115 of a user's frequent locations. The frequent locations interface 110 can list selectable tabs 116, 117, 118 of the more precise frequent sub-locations and plots 126, 127, 128 on the map-view 115 showing the location of the sub-locations within the larger frequent location. The selectable tabs 116, 117, 118 can also include information about a number of visits to the sub-location over a period of time. Selection of a sub-location tab can cause the electronic device to display a detailed map view and log interface.

Figure 1C:
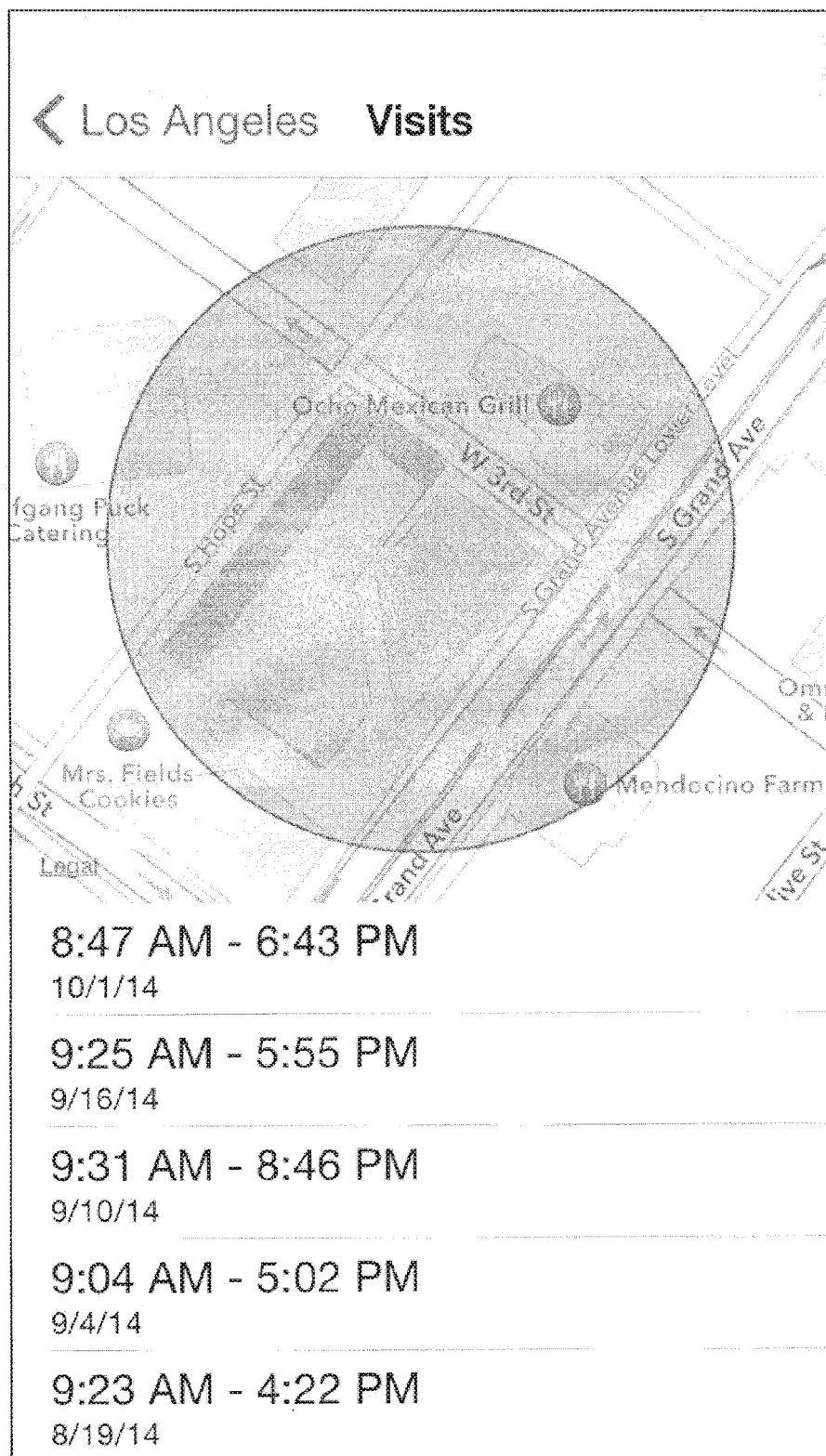
Figure 1D:
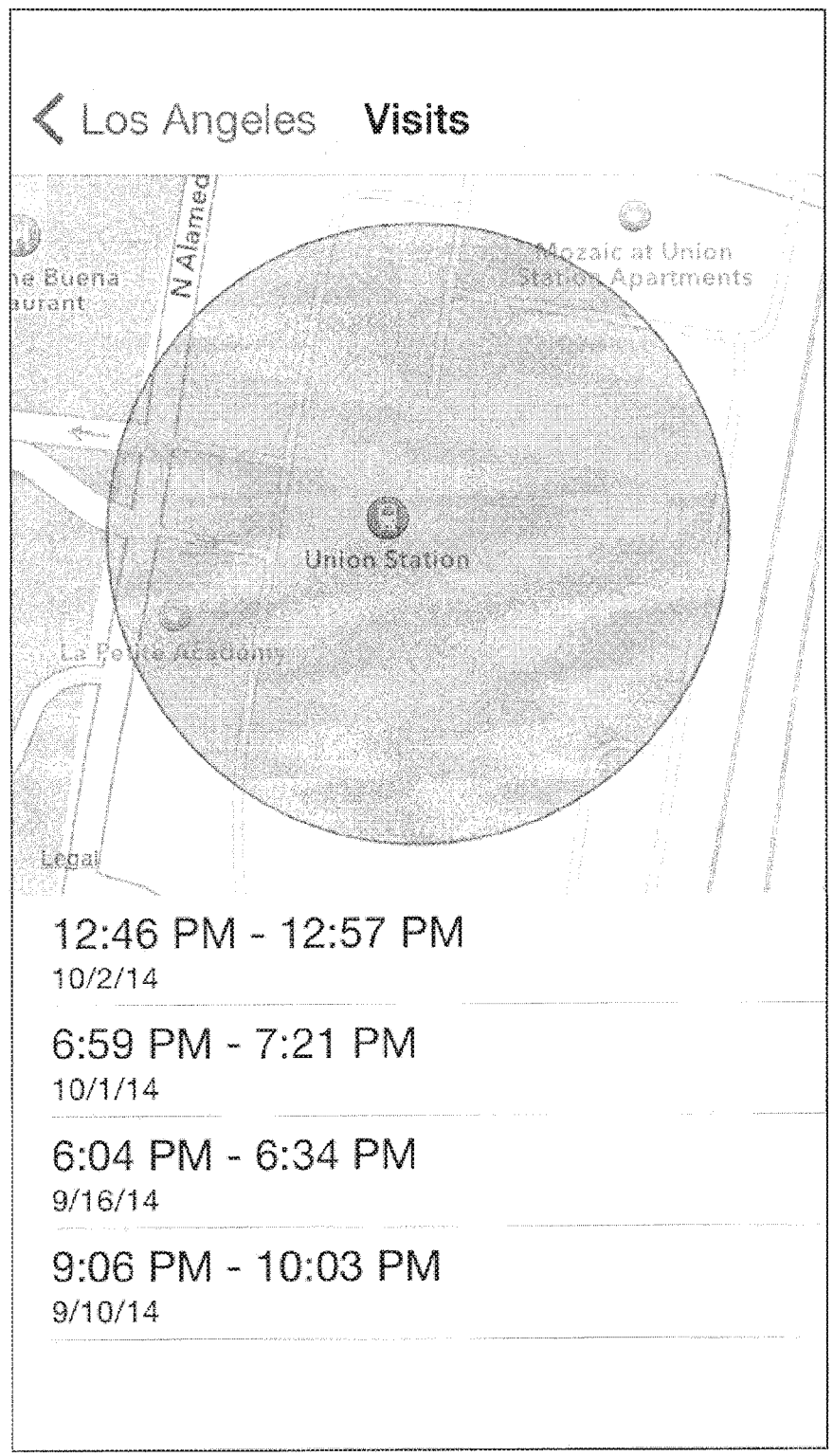
Figure 1E:
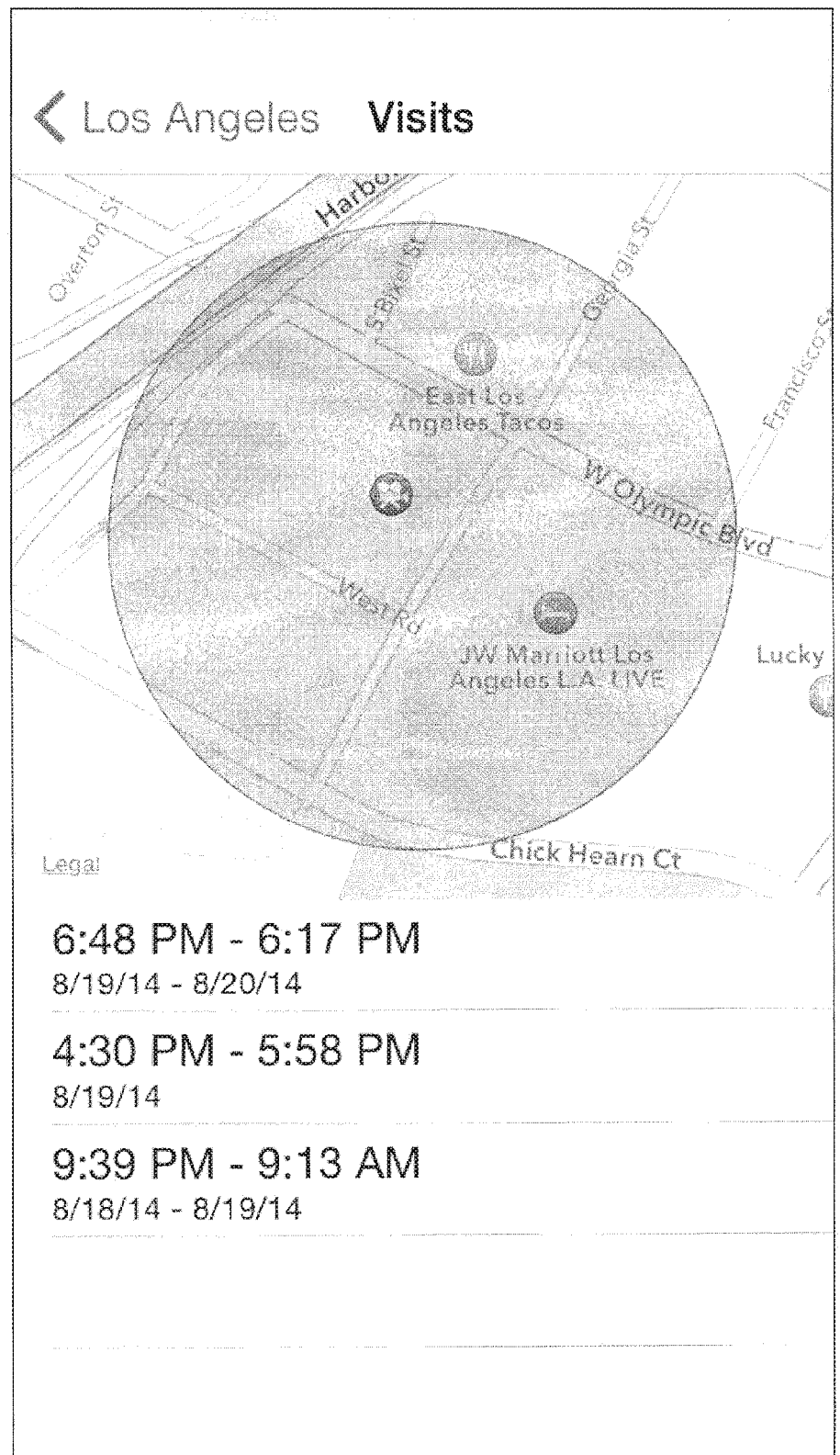

FIGS. 1C-1E illustrate three detailed map views and log interfaces corresponding to the sub-location tabs 116, 117, 118. As shown, the detailed map views and log interfaces include logs of the dates and times spent in the locations and include an object on the map view showing the location of the sub-locations. In some cases, the objects are circles and the length of the radius of the circle can indicate how precise the electronic device has determined the location of the sub-location.

As explained above, a user can be given an option to opt in to frequent location-logging feature. Furthermore, a number of additional safeguards can be put into place to ensure that personal information about the location of a user is kept confidential. For example, the electronic device can be configured to strictly keep frequent location data on the device itself rather than share the data with an online storage and computing service. Additionally, the electronic device can be configured to delete frequent location log entries after short period of time.

As described above, one aspect of the present technology is the gathering and use of location data to improve the user experience related to photographs. The present disclosure contemplates that, in some instances, this gathered data may include personal information data that uniquely identifies or can be used to contact or locate a specific person. Such personal information data can include location-based data, home addresses, work addresses, or any other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities should take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location collection services, the present technology can be configured to allow users to select to "opt in" or "opt out" of participation in the collection of such data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, non-specific location information, such as information abstracted to a city, county, or regional level of detail could be used to tag photographs.

As explained above, frequent location data can be used to tag media content on another device when the media content does not include location data. The location data can be sent to other devices in a number of ways. For example, the data can be sent through a cloud services platform; however, in the preferred embodiments, a privacy feature ensures that any communication from the device containing the log of location data to other devices occurs peer to peer rather than through the cloud. Additionally, the sending device and receiving device can both be required to opt-in to the data transfer (e.g., both devices choosing to allow Bluetooth transmission). The sending and receiving devices can be required to share a common user account (e.g., an account with an online storage and computer services platform).

Figure 2:
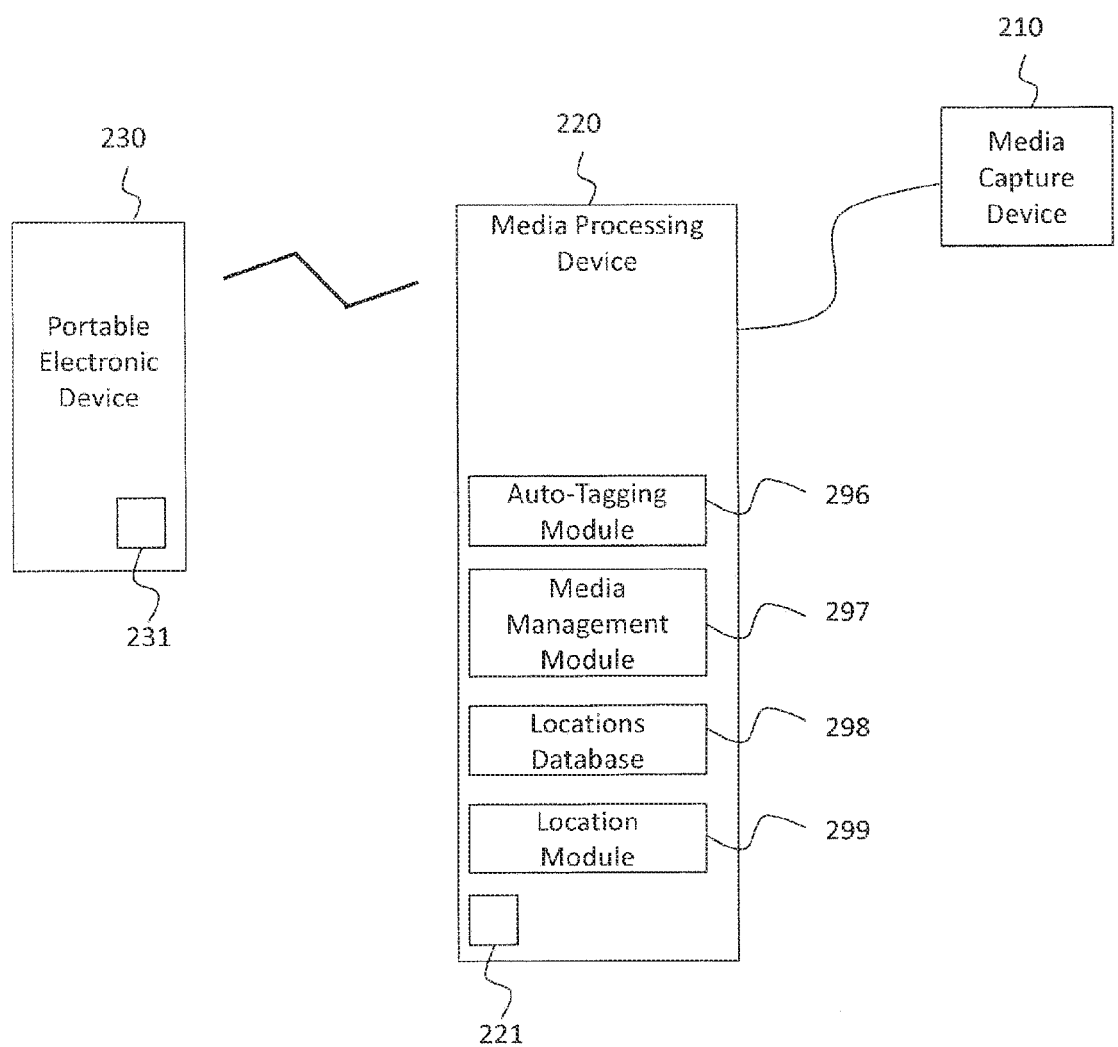
FIG. 2 illustrates a system for using location data from a portable electronic device to tag media content with the location information according to some embodiments of the present technology.

FIG. 2 illustrates a system 200 for using location data from a portable electronic device 230 to tag media content with the location information. In FIG. 2 a media capture device 210 is coupled with a media processing device 220. The media capture device 210 is a separate device from the portable electronic device 230 and does not have its own ability to access location data. For example, the media capture device 210 can be a camera without GPS functionality and the portable electronic device 230 can be a smartphone.

The media processing device 220 (e.g., a personal computer running an image processing application) can receive media content files from the media capture device 210. When the media content files received from the media capture device 210 include timestamps or other indicia of the time that the media files were captured, but do not include location metadata associated therewith, the media processing device 220 can retrieve location and time information from a portable electronic device 230 and determine whether to apply the retrieved location data to the media content files as location metadata.

The media processing device 200 can include a location module 299 configured to receive location data, from the portable electronic device 230, describing the location along with a location timestamp describing when the portable electronic device 230 was at the location. The media processing device 200 also includes a locations database 298 containing a list of frequent locations visited by the portable electronic device 230.

The media processing device 200 can also include a media management module 297 and a location auto-tagging module 296. The media management module 297 imports media, from the media capture device 210, which has a capture timestamp describing when the media file was captured, but that does not have location metadata. The location auto-tagging module 296 automatically tags the media file with a frequent location from the locations database when the capture timestamp describing when the media file was captured correlates with the location timestamp corresponding to when the frequent location was visited.

In the presently preferred embodiments of the present technology, the portable electronic device 230, the media processing device 220, or both the portable electronic device 230 and the media processing device 220 includes a location privacy module 231, 221 for enforcing privacy rules relating to sharing location data between devices. For example, the location privacy module 231, 221 can require that the media processing device 220 and the portable electronic device 230 be coupled via a short-range, peer-to-peer connection (e.g., a Bluetooth connection, etc.). The location privacy module 231, 221 can also require that the media processing device 220 and the portable electronic device 230 each have a common credential with a cloud services platform.

When the privacy rules are satisfied, the portable electronic device 230 can share location data with the media processing device 220. For example, the electronic device 230 can share frequent location data (as explained above) along with temporal information (e.g. dates in a location, time of visit, duration of visit, etc.) about the time spent at a frequent location. The media processing device 220 can then determine whether to apply the retrieved location data to the media content files as location metadata. In some embodiments, the media processing device 220 can also be the portable electronic device 230. Those with ordinary skill in the art having the benefit of this disclosure will appreciate that a wide variety of techniques can be used to determine whether to apply the retrieved location data to the media content files as location metadata.

Figure 3:
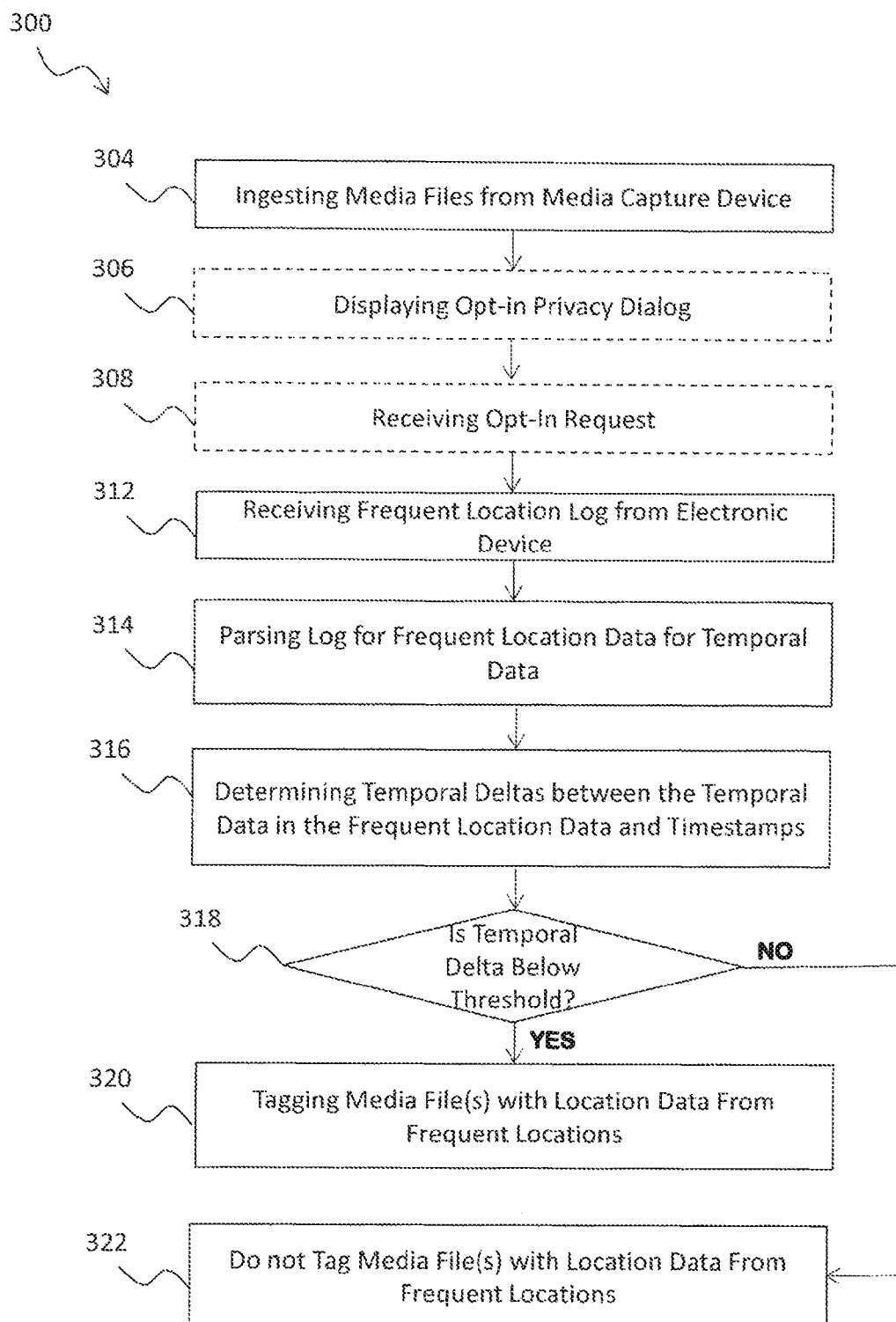
FIG. 3 illustrates an exemplary method of determining whether to apply location data retrieved from an electronic device to media content files as location metadata according to some embodiments of the present technology.

FIG. 3 illustrates an exemplary method 300 of determining whether to apply location data retrieved from an electronic device to media content files as location metadata according to some embodiments of the present technology. The method 300 involves a media processing device ingesting media files from a media capture device 304. For example, in some embodiments, ingesting media files can involve importing digital photos from a camera through a photo editing application on a personal computer.

Optionally, after the ingestion process is initiated, the method 300 can involve the media processing device displaying a graphical element on a display in the form of an opt-in privacy dialog box 306. After receiving a request to opt-in to a location tagging mode 308, the method 300 can involve receiving, in response to a request to the electronic device, frequent location log information 312.

The method 300 can involve the media processing device parsing the log for frequent location data for temporal data 314 and determining the differences (i.e. deltas) between the temporal data in the frequent location data and the media file timestamps 316. For example, the media processing device can determine that the media file timestamp indicates that the media was captured while at a frequent location (i.e. zero delta), that the media file timestamp indicates that the media was captured a short time (e.g. 5 minutes) before arriving at or leaving the frequent location, or that the media file timestamp indicates that the media was captured a longer time (e.g. 1 hour) before arriving at or leaving the frequent location.

Next, the method 300 involves determining whether the temporal deltas fall below a predetermined threshold time difference 318. For media files with associated deltas that do not fall beneath the predetermined time difference, the method 300 involves not tagging the media files with location data 322. On the other hand, when the time difference between a media file timestamp and the temporal data from the frequent location information falls beneath a predetermined threshold value, the method 300 involves tagging the media file(s) with location data from the frequent location information 320.

Figure 4:
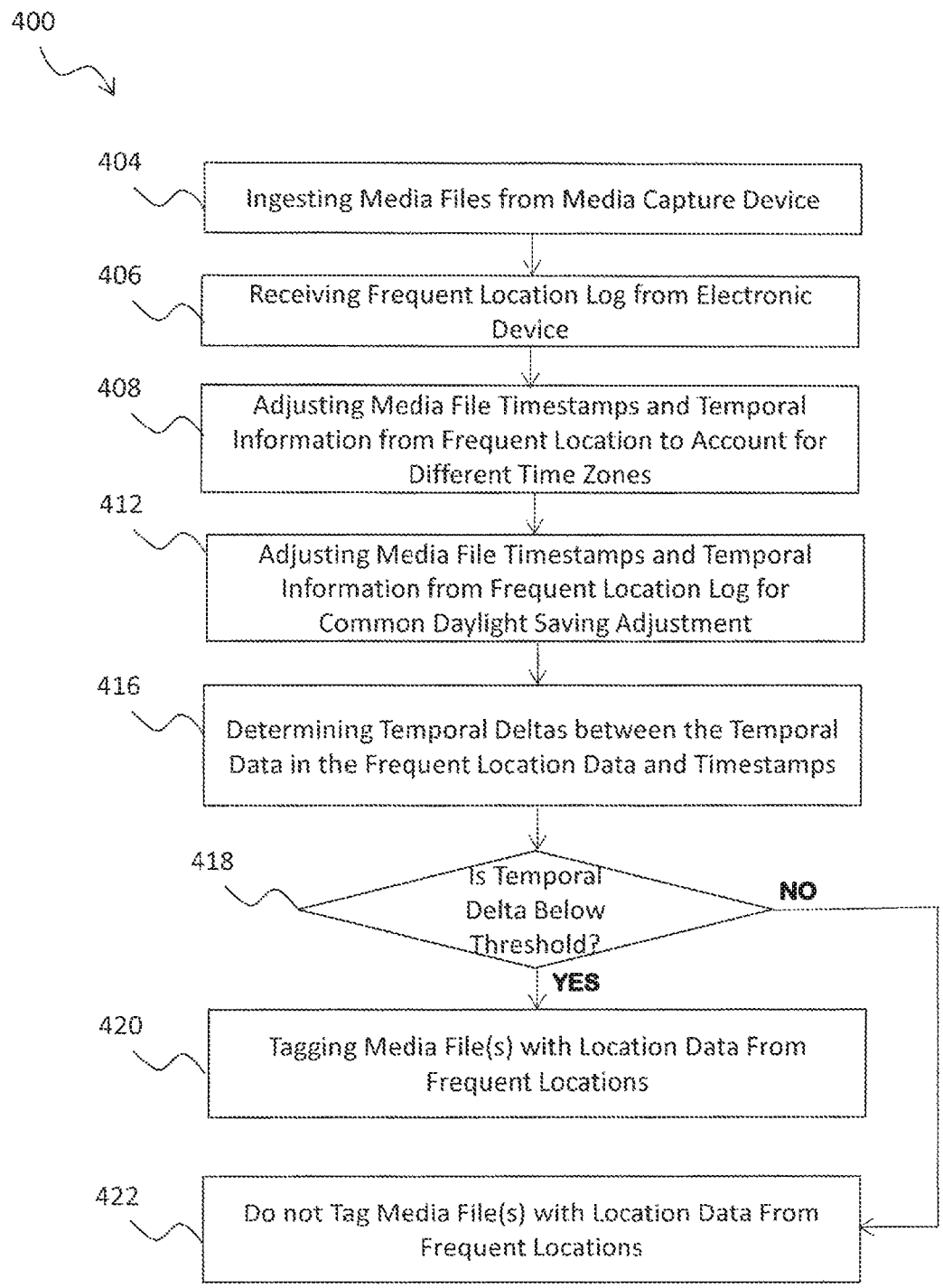
FIG. 4 illustrates an exemplary method of adjusting temporal data and media file timestamps to better determine whether to apply location data retrieved from an electronic device to media content files as location metadata according to some embodiments of the present technology.

The present technology can also make adjustments to the media file timestamps and the frequent location temporal data to make comparing the two more reliable. For example, FIG. 4 illustrates an exemplary method 400 of adjusting temporal data and media file timestamps to better determine whether to apply location data retrieved from an electronic device to media content files as location metadata according to some embodiments of the present technology.

The method 400 involves a media processing device ingesting media files from a media capture device 404 and receiving frequent location log information 406 from a portable electronic device. The method 400 involves adjusting the media file timestamps and temporal information from the frequent location log for the common time zone 408 and daylight savings time adjustments 412.

Next, the method 400 involve determining the differences (i.e. deltas) between the temporal data in the frequent location data and the media file timestamps 416 and determining whether the temporal deltas fall below a predetermined threshold time difference 418. For media files with associated deltas that do not fall beneath the predetermined time difference, the method 400 involves not tagging the media files with location data 422. On the other hand, when the time difference between a media file timestamp and the temporal data from the frequent location information falls beneath a predetermined threshold value, the method 400 involves tagging the media file(s) with location data from the frequent location information 420.

In some embodiments of the present technology, a media processing device can learn user patterns and use the machine learning to automatically tag media items imported without location data metadata with location data from an associated portable electronic device.

Figure 5:
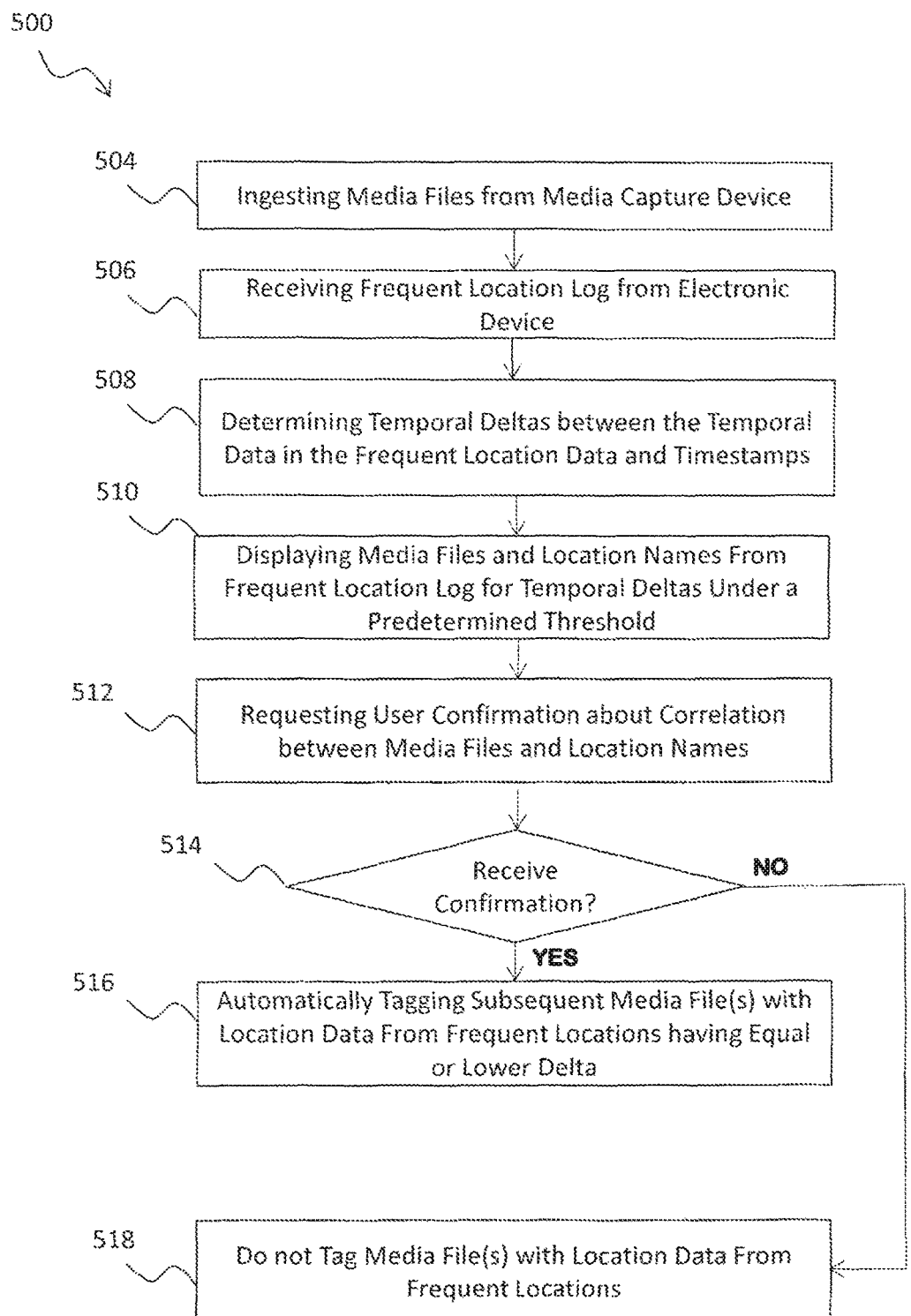
FIG. 5 illustrates an exemplary method of learning when to apply location data retrieved from an electronic device to media content files as location metadata according to some embodiments of the present technology.

For example, FIG. 5 illustrates an exemplary method 500 of learning when to apply location data retrieved from an electronic device to media content files as location metadata according to some embodiments of the present technology.

The method 500 involves a media processing device ingesting media files from a media capture device 504 and receiving frequent location log information 506 from a portable electronic device. The method 400 involves determining the differences (i.e. deltas) between the temporal data in the frequent location data and the media file timestamps 508 and displaying the media files and the location names from the frequent location log when the delta between the media file time stamp and the temporal information from the frequent location log falls beneath a predetermined threshold 510.

The method 500 also involves requesting confirmation from a user about whether the media files correlate with the location names 512 and determining whether the media processing device receives confirmation 514. If so, the method 500 involves the media processing system automatically tagging subsequent media files with location metadata from frequent locations having equal or lower deltas 516. When a user does not provide confirmation, the method 500 involves not tagging the media files with location data 518.

Figure 6A:
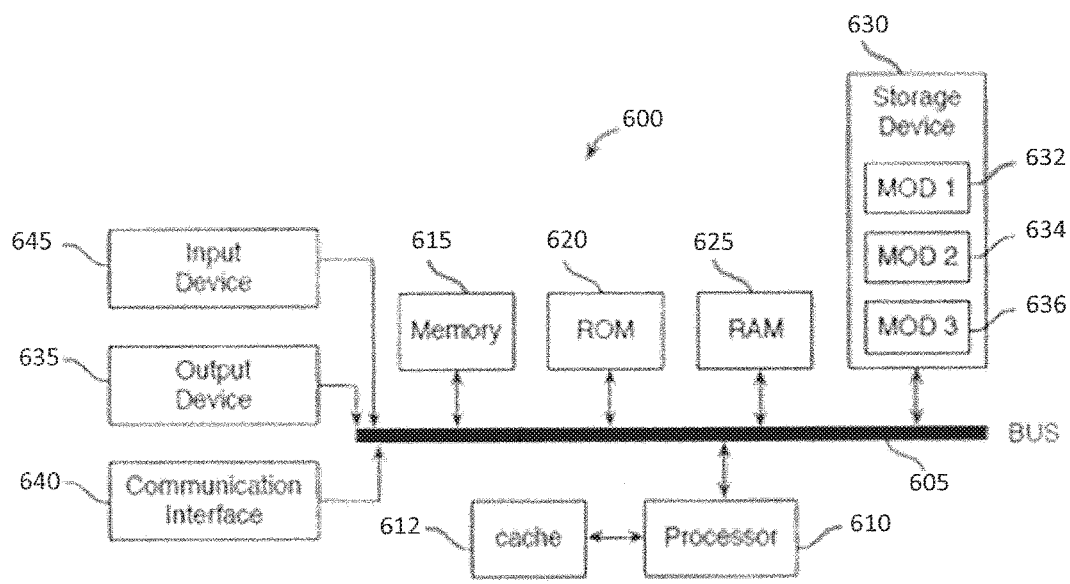
FIGS. 6A and 6B illustrate exemplary possible system embodiments.
Figure 6B:
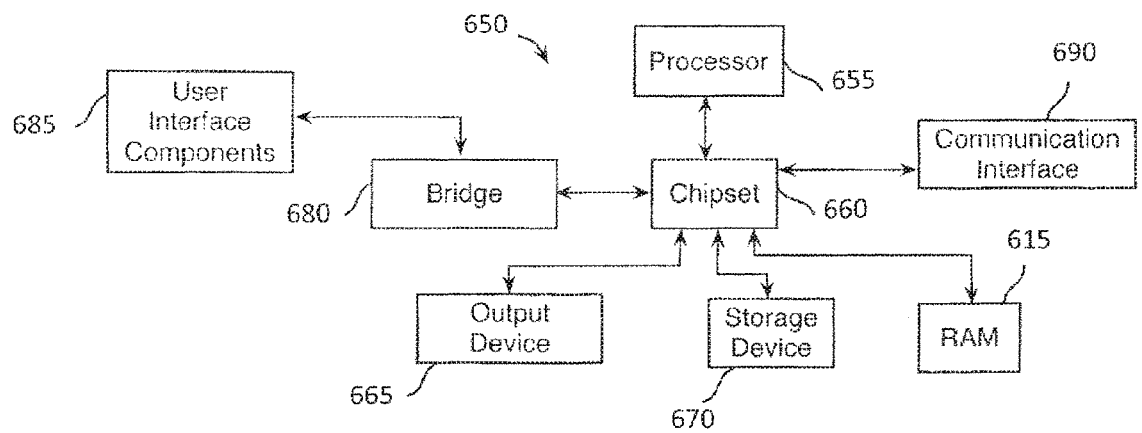

FIGS. 6A and 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600, wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method(s) and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A system configured to tag a media file with a location's description, comprising:
    an output device configured to present information to a user;
    an input device configured to receive user input from the user;
    memory comprising instructions; and
    a processor configured to execute the instructions to:
        receive a media file lacking location data and having capture time data indicating time associated with capturing the media file;
        upon determining that the media file lacks location data, cause the output device to present a request for user input, the request being for access to location data from a portable electronic device, the location data including at least one location description indicative of a location at which the portable electronic device is detected two or more times and location time data indicating time associated with the system's presence at the location;
        receive, via the input device and in response to the request, user input indicative of the user's approval to enable access to the location data;
        access, in response to the received user input, the location data;
        correct at least one of the capture time data or the location time data such that the capture time data and the location time data are in a same format; and
        automatically tag, in response to the correction, the media file with the at least one location description when the capture time data correlates with the location time data.

2. The system of claim 1, wherein one or more communications between the system and the portable electronic device is performed via a peer to peer communication mechanism.

3. The system of claim 1, wherein the system and the portable electronic device are associated with each other via a user account.

4. The system of claim 3, wherein the memory comprises additional instructions and wherein the processor is configured to execute the additional instructions to:
    cause the output device to display the received media file and the location data; and receive, via the input device, a second user input indicative of the user's confirmation that the location data describes a location where the media file was captured.

5. The system of claim 3, wherein the correction accounts for one or more of:
  a difference between a time zone associated with the capture time data and a time zone associated with the location time data; and
  a difference between a daylight savings time system associated with the capture time data and a daylight savings time system associated with the location time data.

6. The system of claim 5, wherein the memory comprises additional instructions and wherein the processor is configured to execute the additional instructions to:
  determine that the capture time data correlates with the location time data when the capture time data has a predetermined relationship with the location time data.

7. The system of claim 6, wherein the processor is configured to execute the additional instructions to determine that the capture time data correlates with the location time data when the capture time data has a predetermined relationship with the location time data comprises the processor being configured to execute the additional instructions to:
  determine, in response to the correction, a time difference between the location time data and the capture time data; and
  determine that the predetermined relationship exists when the time difference is lower than a threshold time difference.

8. A method of tagging a media file with a location's description, comprising:
  receiving, by a processor, a media file lacking location data and having capture time data indicating time associated with capturing the media file;
  causing, by the processor and in response to determining that the media file lacks location data, an output device coupled to the processor to present a request for user input, the request being for access to location data from a portable electronic device that is coupled to the processor, the location data including at least one location description indicative of a location at which the portable electronic device is detected two or more times and location time data indicating time associated with a presence of a system that includes the processor at the location;
  receiving, via an input device coupled to the processor and in response to the request, user input indicative of an approval to enable access to the location data;
  accessing, in response to the received user input, the location data;
  correcting at least one of the capture time data or the location time data such that the capture time data and the location time data are in a same format; and
  automatically tagging, in response to the correction, the media file with the at least one location description when the capture time data correlates with the location time data.

9. The method of claim 8, wherein one or more communications between the system and the portable electronic device is performed via a peer to peer communication mechanism.

10. The method of claim 8, wherein the system comprising the processor and the portable electronic device are associated with each other via a user account.

11. The method of claim 10, further comprising:
  causing the output device to display the received media file and the location data; and
  receiving, via the input device, a second user input indicative of a confirmation that the location data describes a location where the media file was captured.

12. The method of claim 10, wherein the correction accounts for one or more of:
  a difference between a time zone associated with the capture time data and a time zone associated with the location time data; and
  a difference between a daylight savings time system associated with the capture time data and a daylight savings time system associated with the location time data.

13. The method of claim 12, further comprising:
  determining that the capture time data correlates with the location time data when the capture time data has a predetermined relationship with the location time data.

14. The method of claim 13, wherein determining that the capture time data correlates with the location time data when the capture time data has a predetermined relationship with the location time data comprises:
  determining, in response to the correction, a time difference between the location time data and the capture time data; and
  determining that the predetermined relationship exists when the time difference is lower than a threshold time difference.

15. A non-transitory computer readable storage medium storing information, the information comprising instructions for tagging a media file with a location's description which, when executed by a processor, cause the processor to:
  receive a media file lacking location data and having capture time data indicating time associated with capturing the media file;
  upon determining that the media file lacks location data, cause an output device coupled to the processor to present a request for user input, the request being for access to location data from a portable electronic device, the location data including at least one location description indicative of a location at which the portable electronic device is detected two or more times and location time data indicating time associated with a presence of a system that includes the processor at the location;
  receive, via an input device coupled to the processor and in response to the request, user input indicative of an approval to enable access to the location data;
  access, in response to the received user input, the location data;
  correct at least one of the capture time data or the location time data such that the capture time data and the location time data are in a same format; and
  automatically tag, in response to the correction, the media file with the at least one location description when the capture time data correlates with the location time data.

16. The non-transitory computer readable storage medium of claim 15, wherein one or more communications between the system and the portable electronic device is performed via a peer to peer communication mechanism.

17. The non-transitory computer readable storage medium of claim 15, wherein the system comprising the processor and the portable electronic device are associated with each other via a user account.

18. The non-transitory computer readable storage medium of claim 17, further comprising additional instructions, which when executed by the processor, cause the processor to:
- cause the output device to display the received media file and the location data; and
- receive, via the input device, a second user input indicative of a confirmation that the location data describes a location where the media file was captured.

19. The non-transitory computer readable storage medium of claim 17, wherein the correction accounts for one or more of:
- a difference between a time zone associated with the capture time data and a time zone associated with the location time data; and
- a difference between a daylight savings time system associated with the capture time data and a daylight savings time system associated with the location time data.

20. The non-transitory computer readable storage medium of claim 19, further comprising additional instructions, which when executed by the processor, cause the processor to:
- determine, in response to the correction, a time difference between the location time data and the capture time data; and
- determine that the predetermined relationship exists when the time difference is lower than a threshold time difference.

* * * * *